US007394835B2

(12) United States Patent
Youn et al.

(10) Patent No.: US 7,394,835 B2
(45) Date of Patent: Jul. 1, 2008

(54) APPARATUS AND METHOD FOR GUARANTEEING PERFORMANCE OF PACKET IN ETHERNET SYSTEM

(75) Inventors: Ji Wook Youn, Daejeon (KR); Hyun Ha Hong, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 787 days.

(21) Appl. No.: 10/858,943

(22) Filed: Jun. 1, 2004

(65) Prior Publication Data

US 2005/0152348 A1 Jul. 14, 2005

(30) Foreign Application Priority Data

Dec. 23, 2003 (KR) .................. 10-2003-0095374

(51) Int. Cl.
*H04J 3/04* (2006.01)
(52) U.S. Cl. ........................... 370/535; 370/389
(58) Field of Classification Search ................. 370/535, 370/389, 466, 542, 401, 353, 411, 413
See application file for complete search history.

(56) References Cited

U.S. PATENT DOCUMENTS

| 6,014,708 | A | 1/2000 | Klish |
| 6,496,519 | B1 | 12/2002 | Russell et al. |
| 2001/0043603 | A1 | 11/2001 | Yu |
| 2003/0108069 | A1* | 6/2003 | Yamada ..................... 370/535 |

FOREIGN PATENT DOCUMENTS

| KR | 1020030020745 A | 3/2003 |
| KR | 1020030051524 A | 6/2003 |

OTHER PUBLICATIONS

Xin Li et al., "Encapsulation and Rate Adaptation for Ethernet Over SDH", State Key Laboratory on Microwave & Digital Comm. 0-7803-7547-May 2, 2002, 2002 IEEE (pp. 1301-1305).
Mike Scholten et al., "Data Transport Applications Using GFP", Emerging Data Over SONET/SKH (DOS) Standards and Technology, IEEE COmmunications Magazine, May 2002, pp. 96-103).

* cited by examiner

*Primary Examiner*—Edward Urban
*Assistant Examiner*—Tu Nguyen
(74) *Attorney, Agent, or Firm*—Blakely, Sokoloff, Taylor & Zafman LLP

(57) ABSTRACT

Provided is an apparatus for guaranteeing the performance of Ethernet packets in an Ethernet system. A packet sorting unit receives the Ethernet packets, processes header information of the Ethernet packets, and sorts the Ethernet packets. A packet processing unit stores the Ethernet packets, calculates the number of the Ethernet packets, and outputs the Ethernet packets. A packet to synchronous digital hierarchy frame converting unit receives the Ethernet packets output from the packet processing unit, converts the received Ethernet packets into synchronous digital hierarchy frames, calculates the number of the converted frames, maps the frames to a virtual container group, and outputs the virtual container group. And a signal processing unit measures the performance of the Ethernet packets on the basis of the number of the Ethernet packets stored in the packet processing unit and the number of the frames, and outputs the first and second control signals.

7 Claims, 4 Drawing Sheets

APPARATUS AND METHOD FOR GUARANTEEING PERFORMANCE OF PACKET IN ETHERNET SYSTEM

This application claims the priority of Korean Patent Application No. 2003-95374, filed on Dec. 23, 2003, in the Korean Intellectual Property Office, the disclosure of which is incorporated herein in its entirety by reference.

BACKGROUND OF THE INVENTION

1. Field of the Invention

The present invention relates to an apparatus and method for guaranteeing the performance of Ethernet packets in an Ethernet system that converts the Ethernet packets into synchronous digital hierarchy (SDH) frames and transmits the SDH frames.

2. Description of the Related Art

Since conventional Ethernet systems for transmitting Ethernet packets have a sole purpose of providing best effort service, they do not guarantee high quality of service and high transmission performance. However, Ethernet systems for transmitting Ethernet packets have currently been changed to have a structure meeting consumers' various demands. In order to satisfy the various customers' demands, services need to be differentiated and the performance of the Ethernet packets must be guaranteed.

Many attempts have been made to guarantee high quality of service and high transmission performance of Ethernet packet transmission systems. Among them, a method of converting Ethernet packets into synchronous digital hierarchy (SDH) frames and then transmitting the SDH frames has been studied to guarantee the transmission performance of the systems.

The conventional method of transmitting the Ethernet packets as the SDH frames is a port-based method in which the Ethernet packets are mapped to virtual containers, which are previously assigned by input ports, without processing information on the Ethernet packets. Since the conventional method controls only the SDH frames to guarantee the performance of the systems, it can guarantee the transmission performance over physical transmission lines. However, the conventional method cannot guarantee the performance of the Ethernet packets within the virtual containers and cannot differentiate services, thereby failing to provide various services.

SUMMARY OF THE INVENTION

The present invention provides an apparatus and method, which can guarantee the performance of Ethernet packets in an Ethernet system by measuring the number of Ethernet packets that are sorted by destinations and the number of frames that are placed in virtual containers, and can control a bandwidth more flexibly by sorting the Ethernet packets, which are input from a plurality of input ports, by destinations.

According to an aspect of the present invention, there is provided an apparatus for guaranteeing the performance of Ethernet packets in an Ethernet system, the apparatus comprising: a packet sorting unit, which receives the Ethernet packets, processes header information of the Ethernet packets, and sorts the Ethernet packets in response to a first control signal; a packet processing unit, which stores the sorted Ethernet packets therein, calculates the number of the stored Ethernet packets, and outputs the Ethernet packets in response to a second control signal; a packet to synchronous digital hierarchy frame converting unit, which receives the Ethernet packets output from the packet processing unit, converts the received Ethernet packets into synchronous digital hierarchy frames, calculates the number of the converted frames, maps the frames to a virtual container group, and outputs the virtual container group; and a signal processing unit, which measures the performance of the Ethernet packets on the basis of the number of the Ethernet packets stored in the packet processing unit and the number of the frames, and outputs the first and second control signals.

According to another aspect of the present invention, there is provided a method of guaranteeing the performance of Ethernet packets in an Ethernet system, the method comprising: receiving the Ethernet packets and sorting the Ethernet packets by destinations or services using header information of the Ethernet packets; storing the sorted Ethernet packets and calculating the number of the stored Ethernet packets; converting the stored Ethernet packets into synchronous digital hierarchy frames in a predetermined order, calculating the number of the converted frames, and mapping the frames to virtual containers; and measuring the performance of the Ethernet packets on the basis of the number of the stored Ethernet packets and the number of frames.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
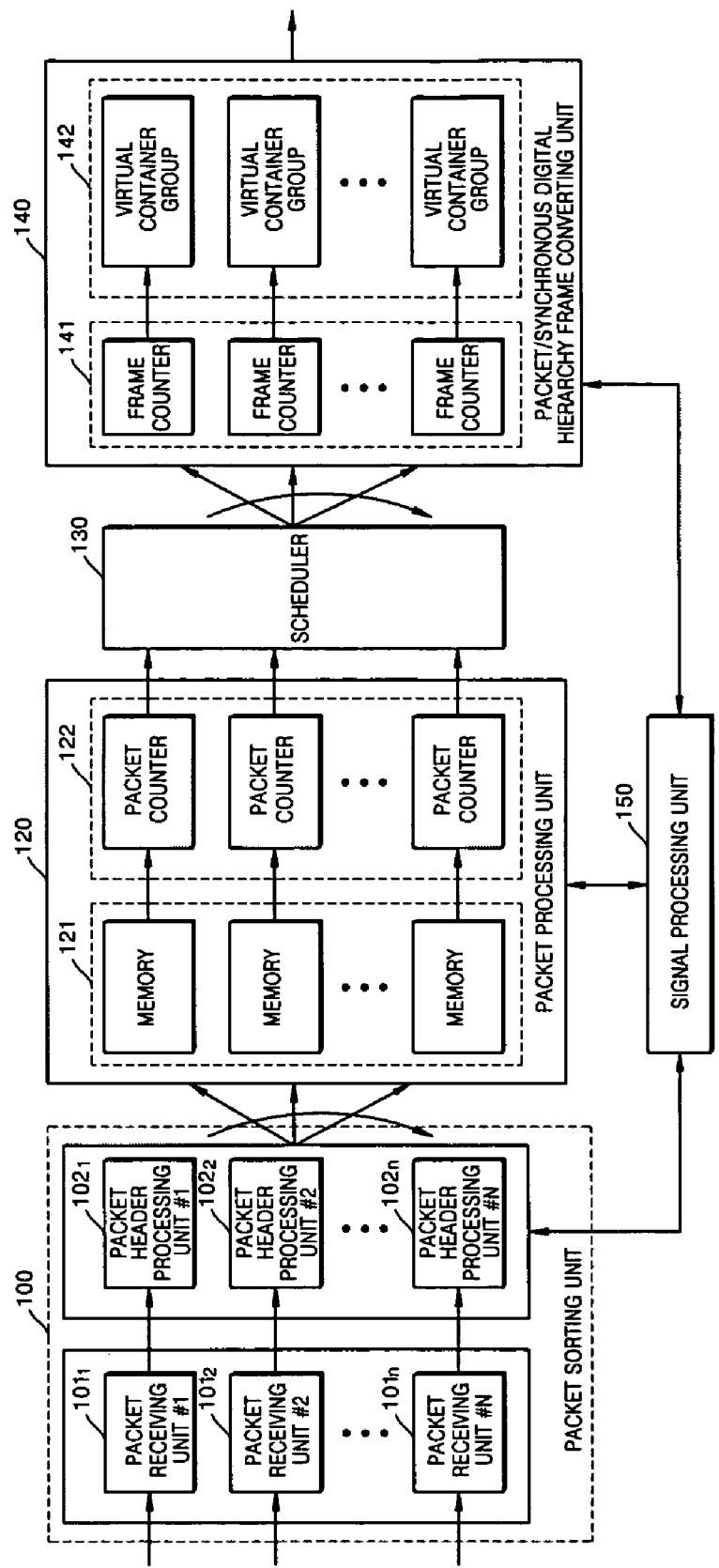
FIG. 1 is a block diagram illustrating an apparatus for guaranteeing the performance of Ethernet packets in an Ethernet system that converts the Ethernet packets into synchronous digital hierarchy(SDH) frames and then transmits the SDH frames according to a first preferred embodiment of the present invention.
Figure 2:
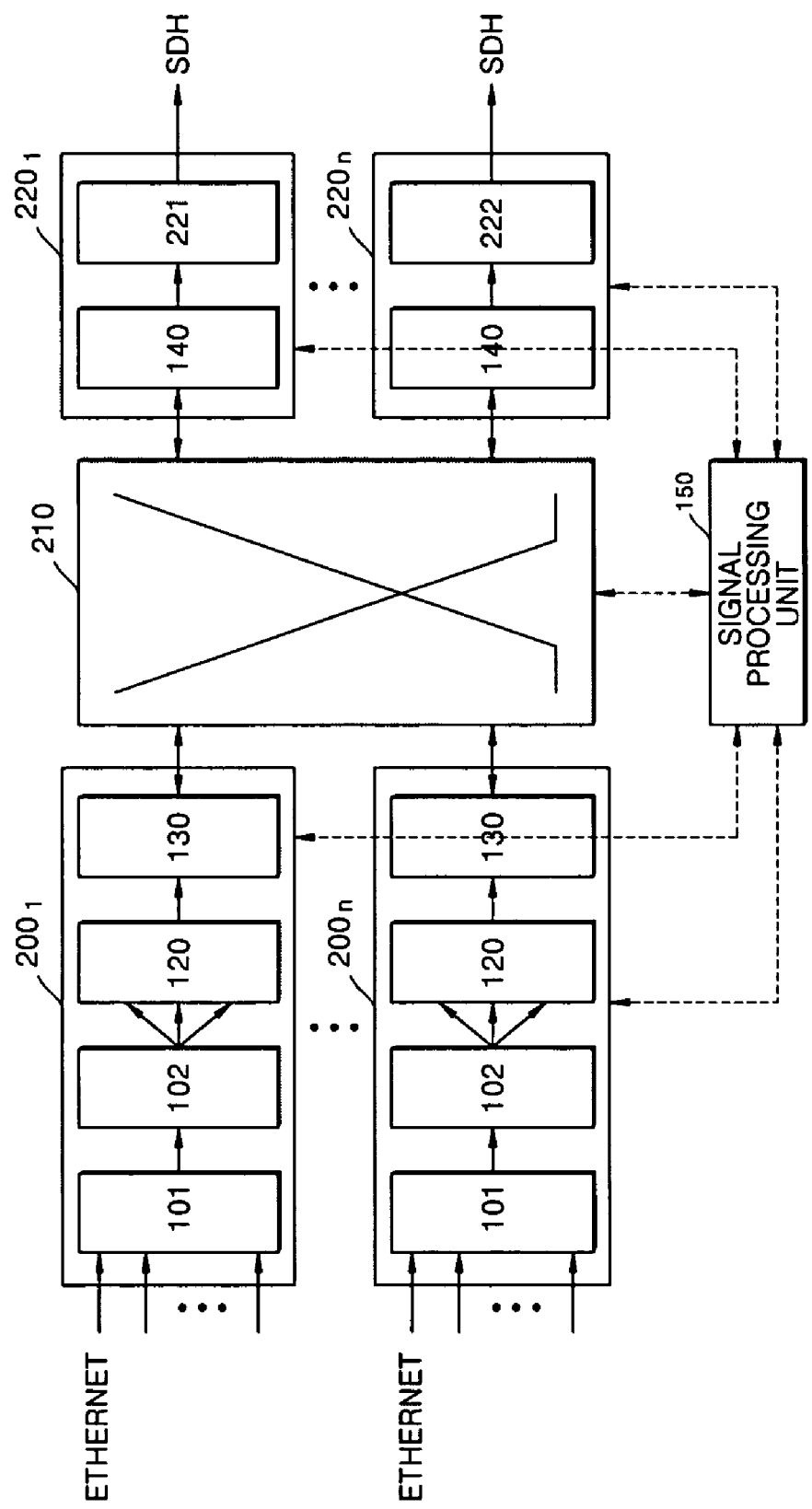
FIG. 2 is a block diagram illustrating a configuration of a plurality of apparatuses constructed as the apparatus of FIG. 1 according to a second preferred embodiment of the present invention.

The present invention will now be described more fully with reference to the accompanying drawings, in which preferred embodiments of the invention are shown. FIG. 1 is a block diagram illustrating an apparatus for guaranteeing the performance of Ethernet packets in an Ethernet system that converts the Ethernet packets into synchronous digital hierarchy (SDH) frames and then transmits the SDH frames according to a first preferred embodiment of the present invention. Referring to FIGS. 1 and 2, it is shown that there are n number of same function blocks. For an easy explanation, it is assumed that there is one function block. That is, the same reference numerals having subscripts perform the same functions.

A packet sorting unit 100 receives Ethernet packets from a plurality of input ports and sorts the Ethernet packets by destinations or services using header information of the received Ethernet packets. In more detail, a packet receiving unit 101 physically interfaces with the Ethernet packets and transmits the input Ethernet packets to a packet header processing unit 102. The packet header processing unit 102 processes the header information of the Ethernet packets input from the packet receiving unit 101 according to predetermined policy set by a signal processing unit 150, and sorts the Ethernet packets by destinations or services. The predetermined policy will be explained later.

The Ethernet packets sorted by destinations or services in the packet header processing unit 102 are temporarily stored in a memory 121 included in the packet processing unit 120. The packet processing unit 120 includes the memory 121, in which the Ethernet packets are temporarily stored, and a packet counter 122. The memory 121 temporarily stores the Ethernet packets input from the packet header processing unit 102, and the packet counter 122 measures the number of Ethernet packets output from the memory 121. A scheduler 130 outputs the Ethernet packets, which are prioritized and stored in the memory 121 of the packet processing unit 120, to a packet to SDH frame converting unit 140 according to the predetermined policy set by the signal processing unit 150.

The packet to SDH frame converting unit 140 includes a frame counter 141 and a virtual container group 142. The frame counter 141 converts the Ethernet packets input from the scheduler 130 into SDH frames and measures the number of the frames that are to be input to a virtual container group 142. Here, the container group 142 consists of a plurality of virtual containers, and the number of the virtual containers is dynamically determined depending on service levels or policy when routes are determined by the destinations, thereby flexibly controlling a bandwidth of the system.

The signal processing unit 150 compares the number of the Ethernet packets sorted by destinations, which is measured by the packet processing unit 120, with the number of the frames input to the virtual container group 142, which is measured by the packet to SDH frame converting unit 140, so as to measure the performance of the Ethernet packets in each node, and generates signals to control the packet sorting unit 100, the packet processing unit 120, and the packet to SDH frame converting unit 140 according to the predetermined policy. Service Level Agreement (SLA) is referred to as the predetermined policy. The SLA is a contract between a customer and a service provider, which defines the service provider's responsibility to the customer with respect to latency time, bandwidth, system downtime, or the like, and the type and extent of remuneration if the responsibility is not met.

Accordingly, in the system to which the present invention is applied, the Ethernet packets are prioritized according to the predetermined policy. If a collision occurs, data having a lower priority is earlier discarded. To be more specific, the Ethernet packets with media access control (MAC) address, virtual local area network identifier (VLAN ID), priority bit, or differentiated services code point (DSCP) are sorted in a preset buffer by their destinations, similar characteristics, or service levels, according to the predetermined policy. Subsequently, the Ethernet packets filled in the buffer are output to the virtual containers according to a scheduling algorithm, such as weighted round robin (WRR) and weighted random early detection (WRED).

That is, the apparatus for guaranteeing the performance of the Ethernet packets in the Ethernet system sorts the Ethernet packets input from diverse nodes by destinations, and compares the number of the sorted Ethernet packets with the number of the frames input to the virtual container group 142, so as to guarantee the performance of the Ethernet packets in the respective nodes. Further, since the Ethernet packets are converted into the frames and then the frames are placed in the virtual container group 142, which consists of the plurality of virtual containers divided by the destinations, so as to be transmitted to the destinations, the apparatus can provide services, such as virtual private network (VPN) and VLAN.

In the meantime, FIG. 2 is a block diagram illustrating a configuration of a plurality of apparatuses constructed as the above apparatus of FIG. 1 according to a second preferred embodiment of the present invention. Referring to FIG. 2, the packet receiving unit 101, the packet header processing unit 102, the packet processing unit 120, and the scheduler 130 shown in FIG. 1 are included in a function block 200. The frame counter 141 and the virtual container group 142 are included in another function block 140. In other words, the plurality of apparatuses having the same construction as the apparatus of FIG. 1 are configured in such a manner as to use one switch 210.

The Ethernet packets received by the packet receiving unit 101 are sorted by destinations or services by means of the packet header sorting unit 102, and then are input to the switch 210 through the packet processing unit 120 and the scheduler 130. The switch 210 is controlled by the signal processing unit 150, and provides a switching function between n number of Ethernet packet blocks $200_1$ through $200_n$ and n number of SDH frame blocks $220_1$ through $220_n$. As shown in FIG. 2, the packet to SDH frame converting unit 140 is located within the SDH frame block 220, in order to send the Ethernet packets having the same destinations in the respective n number of Ethernet packet blocks $200_1$ through $200_n$ to the same virtual container group 142.

That is, among the Ethernet packets sorted by destinations in the packet header processing unit 102 of the Ethernet packet block 200, the Ethernet packets having the same destinations are transmitted to the same virtual container group 142 via the switch 210, thereby effectively controlling the bandwidth of the system. On the other side, a block 221 physically interfaces with the SDH frames.

Here, the performance of the Ethernet packets is guaranteed by comparing the number of the Ethernet packets sorted by destinations, which is measured by the packet processing unit 120 within the Ethernet packet block 200, with the number of the frames, which is measured by the frame counter 141 within the SDH frame block 220.

Figure 3:
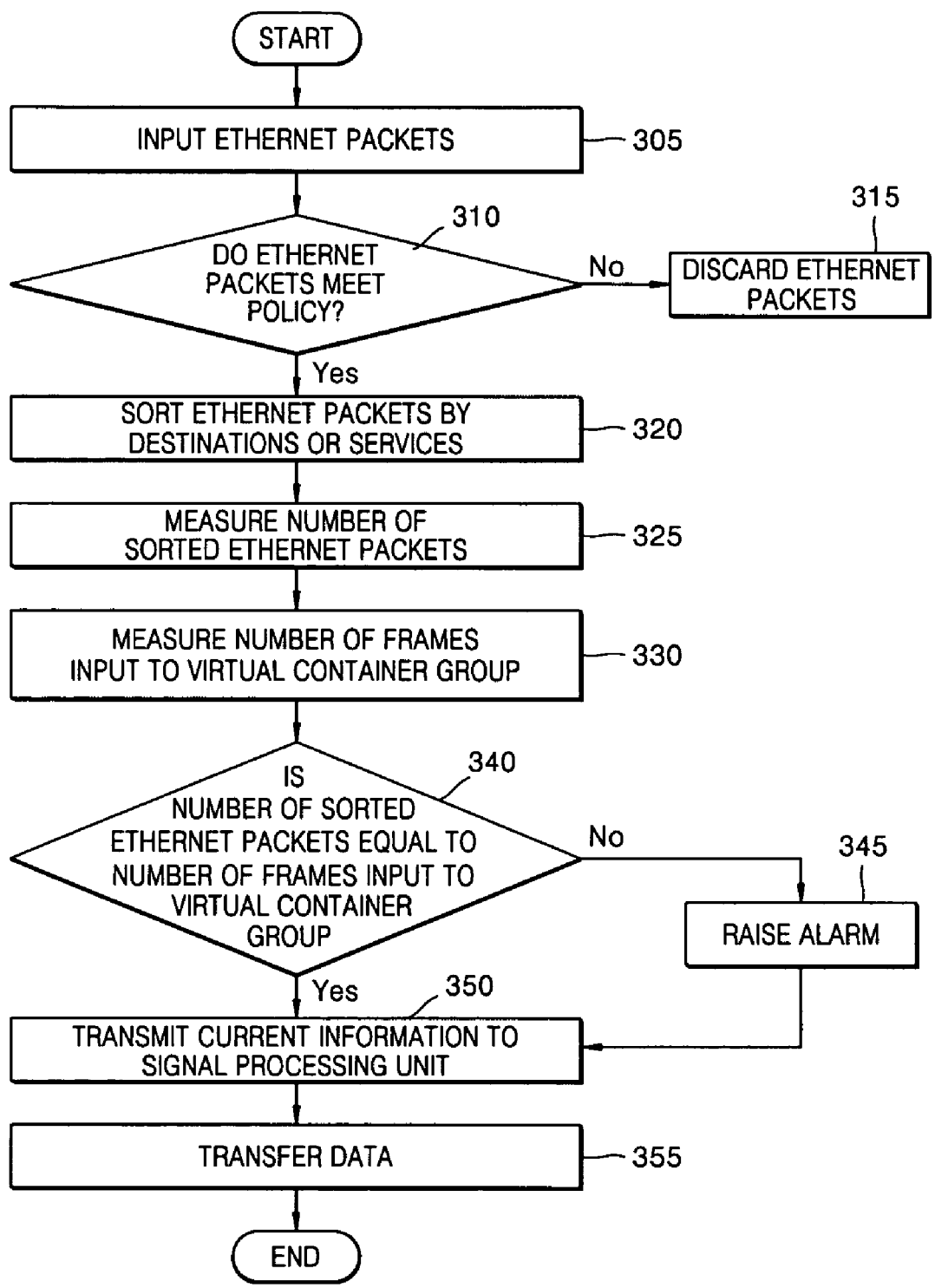
FIG. 3 is a flow chart illustrating a method of guaranteeing the performance of the Ethernet packets in the Ethernet system according to a third preferred embodiment of the present invention.

A method of guaranteeing the performance of the Ethernet packets in the Ethernet system according to a third preferred embodiment of the present invention will be explained below with reference to FIG. 3. In step 305, the Ethernet packets are input to the system. In step 310, the packet header processing unit 102 processes the header information of the Ethernet packets according to the policy set by the signal processing unit 150 to determine whether the Ethernet packets meet the aforesaid policy. If the Ethernet packets are determined to follow the policy in step 310, in step 320, the Ethernet packets are sorted by destinations or services. On the other hand, if the Ethernet packets are determined not to follow the policy in step 310, in step 315, the Ethernet packets are discarded.

In step 325, the packet processing unit 120 receives the Ethernet packets, which are sorted by destinations by the packet header processing unit 102, and measures the number of the Ethernet packets by means of the packet counter 122 located therein. In step 330, the frame counter 141 located within the packet to SDH frame converting unit 140 measures the number of the frames that are to be transmitted to the virtual container group 142. In step 340, the signal processing unit 150 compares the number of the Ethernet packets measured by the packet counter 122 with the number of the frames measured by the frame counter 141 to determine whether the two values are equal to each other. If the two values are determined not to be equal in step 340, in step 345, an alarm is sent to an upper-level operation management software 400 that determines routes and manages service quality. If the two values are determined to be equal to each other in step 340, on the other hand, in step 350, information on the current state is transmitted to the signal processing unit 150. In step 355, normal data transfer is carried out. Through these steps, the performance of the Ethernet packets in the Ethernet system can be guaranteed.

Figure 4:
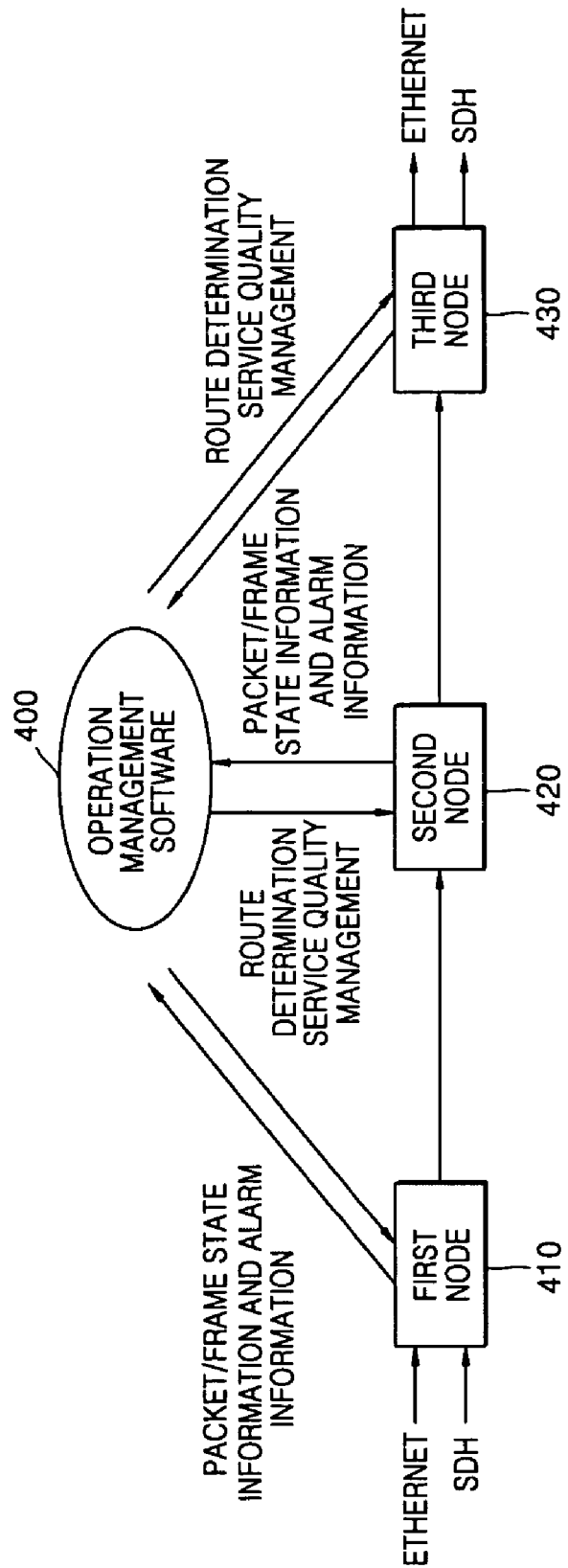
FIG. 4 is a diagram illustrating an application of the apparatus and method for guaranteeing the performance of the Ethernet packets in the Ethernet system over networks according to a fourth preferred embodiment of the present invention.

FIG. 4 is a diagram illustrating an application of the apparatus and method for guaranteeing the performance of the Ethernet packets in the Ethernet system over networks according to a fourth preferred embodiment of the present invention.

The number of the Ethernet packets sorted by destinations or services, the number of the frames input to the virtual container group, current state information, and alarm information, which are obtained from each of first, second and third nodes 410, 420, and 430, are forwarded to the upper-level operation management software 400. The software determines available routes using the current state information collected from the respective nodes, and determines new routes if an alarm occurs, thereby guaranteeing of the performance of the Ethernet system.

The method of guaranteeing the performance of the Ethernet packets in the Ethernet system may be embodied as a computer readable medium having a computer readable program code unit embodied therein. The computer readable medium includes, but not limited to, storage media such as magnetic storage media (e.g., ROMs, RAMs, floppy disks, hard disks, etc.), optically readable media (e.g., CD-ROMs, DVDs, etc.) and carrier waves (e.g., transmissions over the Internet). The computer readable recording medium can be dispersively installed in a computer system connected to a network, and stored and executed as a computer readable code by a distributed computing environment. Furthermore, a font ROM data structure according to the present invention may be embodied as a computer readable medium having the computer readable program code unit embodied therein.

As described above, the apparatus and method for guaranteeing the performance of the Ethernet packets in the Ethernet system can guarantee the performance of the Ethernet packets as compared with the conventional art, can simply operate the system by managing the Ethernet packets having the same destinations in the same group, and can provide various services by effectively controlling the bandwidth when the routes are determined. Therefore, the present invention can maximize the performance and efficiency of the system that converts the Ethernet packets into the SDH frames and then transmits the SDH frames.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for guaranteeing the performance of Ethernet packets in an Ethernet system, the apparatus comprising:

a packet sorting unit, which receives the Ethernet packets, processes header information of the Ethernet packets, and sorts the Ethernet packets in response to a first control signal;

a packet processing unit, which stores the sorted Ethernet packets therein, calculates the number of the stored Ethernet packets, and outputs the Ethernet packets in response to a second control signal;

a packet to synchronous digital hierarchy frame converting unit, which receives the Ethernet packets output from the packet processing unit, converts the received Ethernet packets into synchronous digital hierarchy frames, calculates the number of the converted frames, maps the frames to a virtual container group, and outputs the virtual container group; and a signal processing unit, which measures the performance of the Ethernet packets on the basis of the number of the Ethernet packets stored in the packet processing unit and the number of the frames, and outputs the first and second control signals.

2. The apparatus of claim 1, wherein the packet sorting unit sorts the Ethernet packets by destinations or services in response to the first control signal.

3. The apparatus of claim 1, wherein the packet processing unit includes a scheduler, which outputs the stored Ethernet packets in a predetermined order.

4. The apparatus of claim 1, wherein the virtual container group includes one or more virtual containers, and the number of the virtual containers can vary according to service levels on the Ethernet packets or users' demands.

5. A method of guaranteeing the performance of Ethernet packets in an Ethernet system, the method comprising:

receiving the Ethernet packets and sorting the Ethernet packets by destinations or services using header information of the Ethernet packets;

storing the sorted Ethernet packets and calculating the number of the stored Ethernet packets;

converting the stored Ethernet packets into synchronous digital hierarchy frames in a predetermined order, calculating the number of the converted frames, and mapping the frames to virtual containers; and measuring the performance of the Ethernet packets on the basis of the number of the stored Ethernet packets and the number of frames;

wherein the Ethernet packet performance measuring step includes outwardly transmitting the virtual containers if the number of the Ethernet packets is equal to the number of the frames and handling errors if the number of the Ethernet packets is not equal to the number of the frames.

6. The method of claim 5, wherein the packet to synchronous digital hierarchy frame converting step includes dividing the virtual containers by destinations or services and forming a virtual container group consisting of at least one virtual container.

7. The method of claim 5, wherein the Ethernet packet sorting step includes discarding the Ethernet packets if the Ethernet packets do not meet predetermined policy.

* * * * *